July 10, 1956 W. C. ESPENLAUB 2,754,356

CONTROL SYSTEMS FOR COLOR-TELEVISION RECEIVERS

Filed April 24, 1952 3 Sheets-Sheet 1

INVENTOR.
WALTER C. ESPENLAUB
BY Laurence B. Dodds
ATTORNEY

INVENTOR.
WALTER C. ESPENLAUB
BY Lawrence B. Dodds
ATTORNEY

July 10, 1956 W. C. ESPENLAUB 2,754,356

CONTROL SYSTEMS FOR COLOR-TELEVISION RECEIVERS

Filed April 24, 1952 3 Sheets-Sheet 3

*INVENTOR.*
WALTER C. ESPENLAUB

*BY* Laurence B. Dodds

ATTORNEY

United States Patent Office 2,754,356

Patented July 10, 1956

2,754,356

CONTROL SYSTEMS FOR COLOR-TELEVISION RECEIVERS

Walter C. Espenlaub, Great Neck, N. Y., assignor to Hazeltine Research, Inc., Chicago, Ill., a corporation of Illinois Application April 24, 1952, Serial No. 284,093

18 Claims. (Cl. 178—5.4)

*General*

Figure 1:
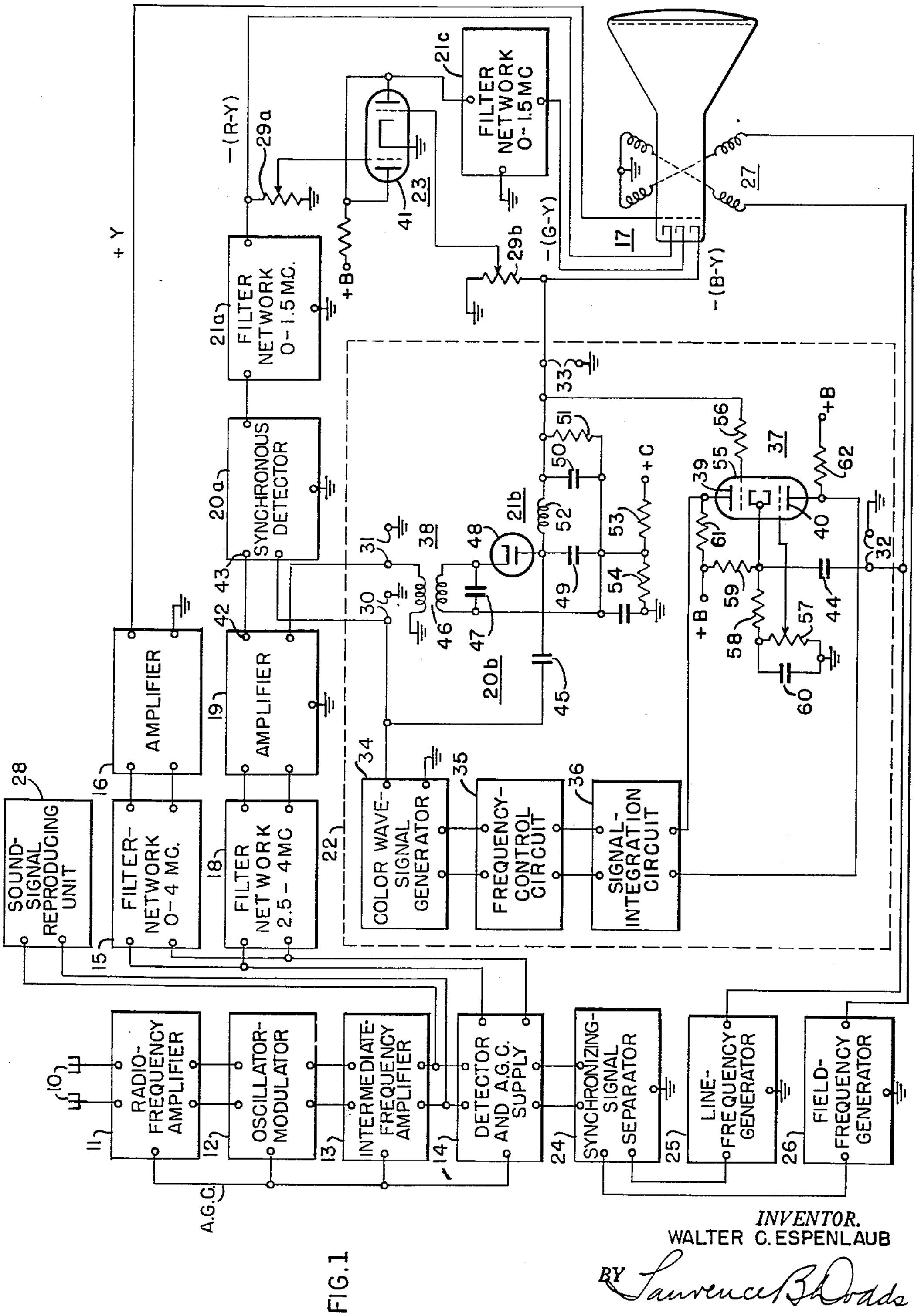

This invention relates to control systems for color-television receivers, specifically, to synchronizing systems for synchronizing the apparatus for deriving the color signals at the receiver with the apparatus at the transmitter for developing these signals as modulation components of a wave signal. The present invention is particularly useful in some of the color-television systems described in copending applications of Bernard D. Loughlin, Serial No. 159,212, entitled "Color-Television System," filed May 1, 1950, and Serial No. 207,154, entitled "Color-Television System," filed January 22, 1951. Accordingly, the invention will be described in relation to some of the systems described in those applications.

In the form of color-television system more completely described in the RCA Review for December, 1949, volume X, at pages 504–524, inclusive, and in the improved forms of such system as described in the above-mentioned copending applications, color signals individually representative of the primary colors, specifically green, red and blue, of a color image being televised are developed at the transmitter. Components of these color signals are applied as modulation signals to a subcarrier wave signal effectively to amplitude-modulate such signal at different phase points thereof. The subcarrier wave signal normally has a predetermined frequency less than the highest video frequency and, in view of the modulation thereof just described, has amplitude and phase characteristics related to the above-mentioned primary colors of the televised image. In a specific form of such system as described in the RCA Review article, this wave signal is effectively modulated at 120° phase intervals by successive ones of the three primary color-signal components. In the improved forms described in the above-mentioned applications, the signal may be effectively modulated at 0° and 90° phase points thereof. In addition to the modulated signal, a signal representative of the brightness or fine detail of the image is also developed at the transmitter, is combined in a common frequency band with the modulated subcarrier wave signal and the composite video-frequency signal is then transmitted in a conventional manner as a modulation signal of a radio-frequency carrier-wave signal.

The receivers in systems of the type just discussed intercept the transmitted signal and derive therefrom the composite video-frequency signal including the brightness signal and the modulated subcarrier wave signal. The modulation components of the latter signal are detected at the receiver by a deriving means which is designed to operate under the control of a locally developed color wave signal in synchronism and in proper time relation with the subcarrier wave-signal modulating means at the transmitter. In a receiver such as is described in the RCA Review article referred to above, the deriving means may derive the modulation components occurring at the 0°, 120° and 240° phase points of the subcarrier wave signal. In some of the receivers described in the above-mentioned applications, this derivation may occur at 0°, 90° and 180° phase points of the subcarrier wave signal. It should be understood, however, that, in any of the systems under discussion, the derivation may occur at any desired phases of the subcarrier wave signal as long as compensating means are included in the receiver to compensate for any color errors introduced by any difference between the timing of the deriving means at the receiver and the timing of the subcarrier wave-signal modulating means at the transmitter. Regardless of the type of deriving means employed at the receiver, it is desired, in order to maintain fidelity of image reproduction, that the deriving means develop in its output circuit color-signal components which represent all of the important characteristics of the color-signal components utilized to modulate the subcarrier wave signal at the transmitter. In order to assure that such representation will occur, a color synchronizing signal is developed at the transmitter and derived at the receiver to control the phase of the color wave signal developed at the receiver so as to effect the above-described synchronization of the deriving means and the modulating means.

In a preferred form of system utilizing such a color synchronizing signal, an unmodulated small portion or burst of the subcarrier wave signal, conventionally designated as a color burst signal, is transmitted so that it occurs during each blanking period following each line-synchronizing pulse. In view of the fact that the burst signal is a small portion of the subcarrier wave signal, it occurs in synchronism and in phase with a predetermined phase thereof, and can be utilized at the receiver to control the phase of the locally generated color wave signal. In proposed systems for utilizing such a color burst signal, additional detection circuits are employed to derive this signal and to compare the phase thereof with a predetermined phase of the locally developed color wave signal. These additional circuits undesirably increase the size and complexity of the receiver. It is preferable to utilize for this purpose equipment normally included in the color-television receiver, using only a minimum of additional circuits. It is, therefore, a purpose of the present invention to describe a control system which effects such result.

In addition to the above-described functions of the types of color-television systems under discussion, in the application Serial No. 207,154, previously referred to herein, there has been described an arrangement for periodically changing the phase sequence in which the color-signal components are applied as modulation components to the subcarrier wave signal at the transmitter and are derived at the receiver. For example, during one interval the green, red and blue color-signal components may modulate the subcarrier wave signal in that phase sequence. During another interval, as described in the application Serial No. 207,154, for the purpose of minimizing the visual effects of cross talk caused by deriving the color-signal components at improper phase angles, the color-signal components may be caused to modulate the subcarrier wave signal in a different phase sequence and to be derived therefrom in this different phase sequence. For example, during the other interval, the green, blue and red color-signal components may modulate the subcarrier wave signal in the order just mentioned. In such a system where the sequence of the color-signal components changes at periodic intervals, there is a need for identifying these intervals so that the sequence in which the color-signal components are derived corresponds to the sequences in which they are utilized at the transmitter to modulate the subcarrier wave signal. In one proposal for effecting such identification, it has been suggested that as a sequence is changed at the transmitter the phasing of the color burst signal should also change to indicate this change in sequence. In such a system, the teachings of the present invention may also be employed to utilize a major portion of the equipment now in a color-television receiver to detect this phase change of the color burst signal and thereby develop a control signal for changing the sequence of derivation at the receiver to correspond with the new sequence at the transmitter.

It is an object of the present invention, therefore, to provide for a color-television receiver a new and improved control system which is relatively simple in construction, is economical and stable in operation.

It is another object of the present invention to provide for a color-television receiver a new and improved control system for synchronizing the color-signal deriving means at the receiver with the color-signal modulating means at the transmitter.

It is still another object of the present invention to provide for a color-television receiver a new and improved control system for effecting such synchronization with a minimum amount of equipment in excess of that required for the derivation of the color signals.

It is an additional object of the present invention to provide for a color-television receiver a new and improved control system for determining the sequence in which color-signal components are derived from a modulated subcarrier wave signal.

In accordance with the present invention, a control system for a color-television receiver comprises a circuit for supplying a composite video-frequency signal comprising during recurring intervals a color-television wave signal amplitude-modulated at different phase points by individual ones of signals representative of a plurality of colors and during intervening intervals a color synchronizing signal having a phase corresponding to a reference phase of the wave signal. The control system also comprises a signal generator for generating a signal harmonically related in frequency to the above-mentioned wave signal and which has a phase which tends to vary from a predetermined phase relation with respect to the previously mentioned reference phase. In addition, the control system comprises a control apparatus including a single detection device and a control circuit coupled in cascade, the input circuit of the detection device being coupled to the supply circuit and the generator and this detection device being responsive jointly during the above-mentioned recurring intervals to the wave signal and the generated signal for deriving a signal representative of the modulation component of the wave signal at a phase point substantially in quadrature with the above-mentioned reference phase. The detection device is also responsive jointly during the intervening intervals to the color synchronizing signal and the generated signal to develop an error signal representative of the relative phases of the generated signal and the color synchronizing signal, the control circuit being responsive to the error signal to derive during these intervening intervals a control effect representative of the relative phase of the above-mentioned generated signal and the color synchronizing signal. The control system also comprises a control device coupled to the generator and the control apparatus for applying this control effect to the signal generator for maintaining the phase of the generated signal substantially at the previously mentioned predetermined phase relation.

For a better understanding of the present invention, together with other and further objects thereof, reference is had to the following description taken in connection with the accompanying drawings, and its scope will be pointed out in the appended claims.

Figure 2:
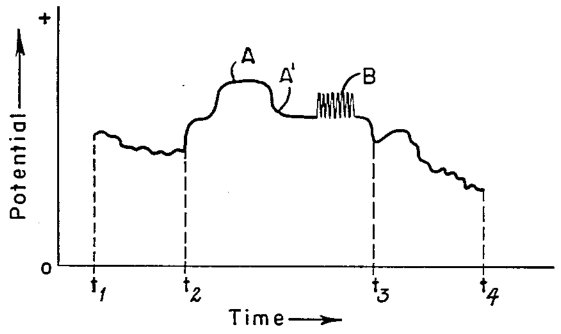
Figure 3:
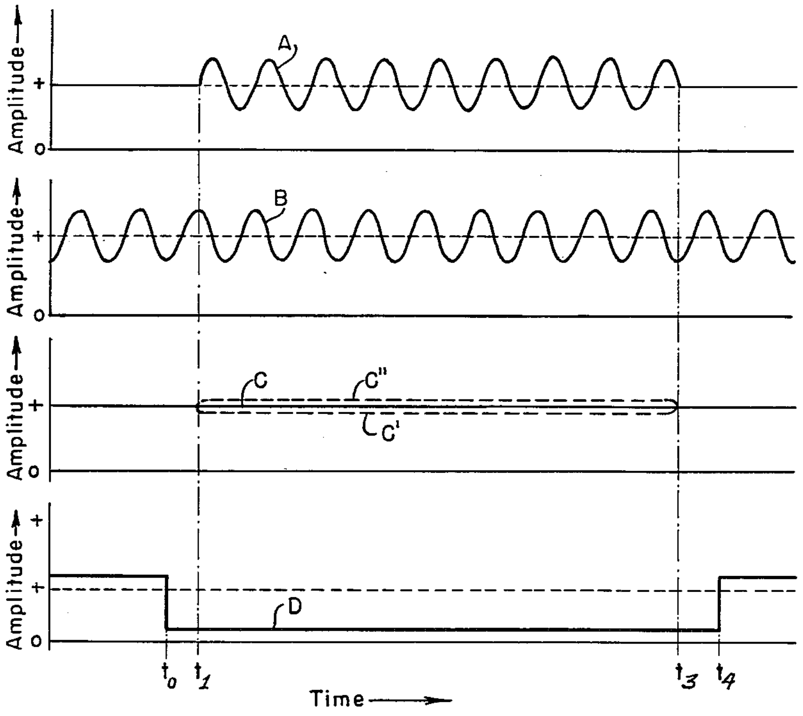
Figure 4:
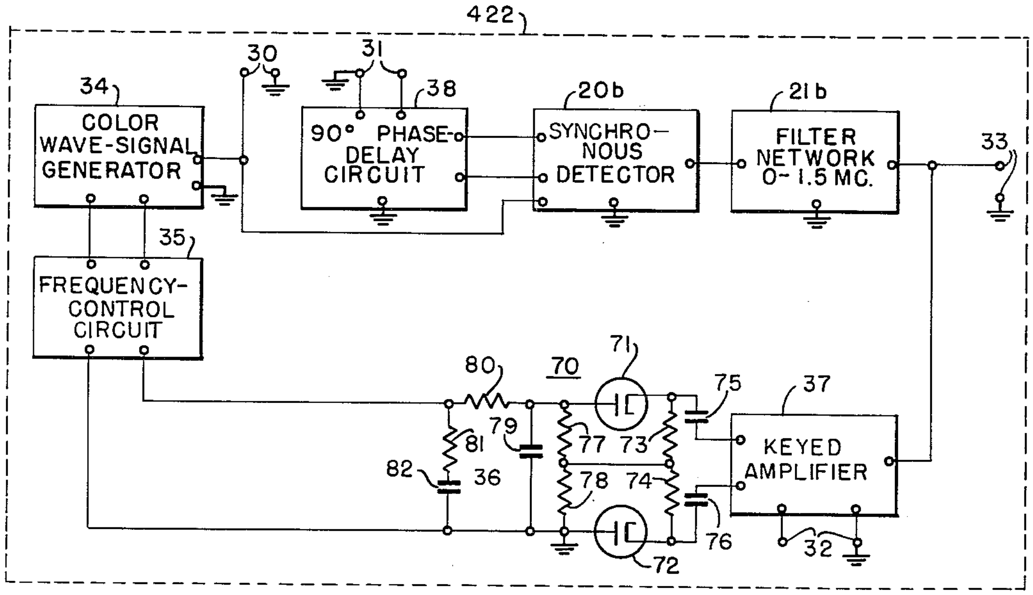
Figure 5:
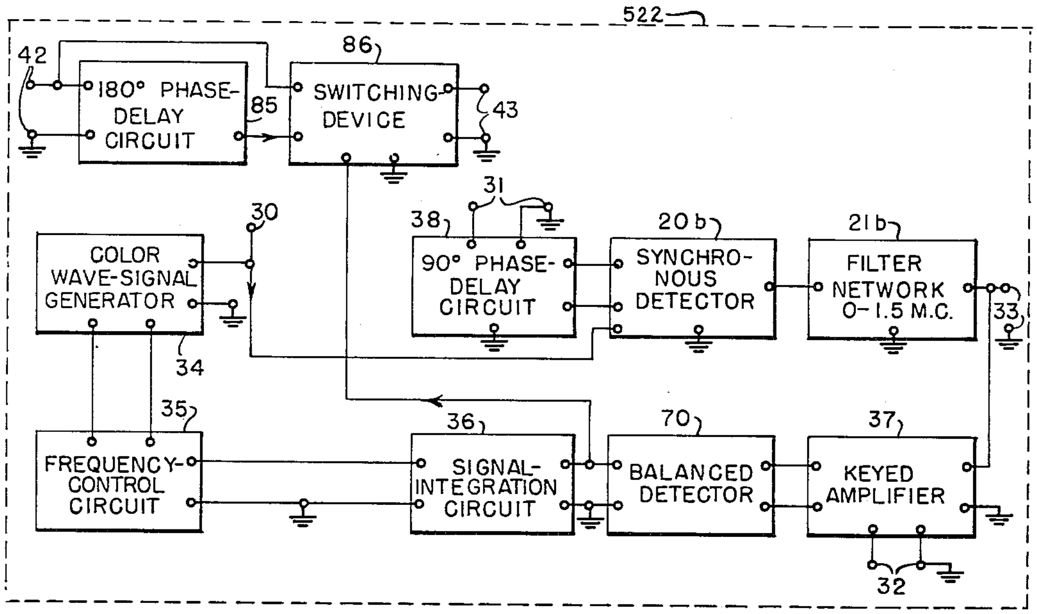

In the drawings, Fig. 1 is a circuit diagram partly schematic of a complete color-television receiver embodying one form of a control system in accordance with the present invention; Figs. 2 and 3 are wave forms utilized in explaining the operation of the control system of Fig. 1; and Figs. 4 and 5 are diagrams of modified forms of the control system of Fig. 1.

*General description of receiver of Fig. 1*

Referring now to Fig. 1 of the drawings, there is represented a color-television receiver including a radio-frequency amplifier 11 of one or more stages having an input circuit coupled to an antenna system 10, 10. Coupled in cascade with the output circuit of the amplifier 11, in the order named, are an oscillator-modulator 12, an intermediate-frequency amplifier 13 of one or more stages, a detector and automatic-gain-control (AGC) supply 14, a 0–4 megacycle filter network 15, a video-frequency amplifier 16 of one or more stages, and a color image-reproducing device 17 preferably of the cathode-ray tube type. The device 17 may comprise, as represented, a single cathode-ray tube having a control electrode coupled to the output circuit of the amplifier 16 and three cathodes individually responsive to the different color signals. The device 17 also may include an arrangement (not shown) for directing the electron beams from the separate cathodes onto suitable color phosphors to reproduce colors in a color image. A tube of this type is more fully described in an article entitled "General description of receivers for the dot-sequential color-television system which employ direct-view tri-color kinescopes" in the RCA Review for June, 1950, as pages 228–232, inclusive.

Also coupled in cascade with the same output circuit of the detector 14 with which the unit 15 is coupled, in the order named, are a 2.5–4 megacycle filter network 18, a wide band amplifier 19, a synchronous detector 20*a* and a 0–1.5 megacycle filter network 21*a* the output circuit of which is coupled to one of the cathodes in the device 17. The output circuit of the amplifier 19 is also coupled through a control system 22, to be described more fully hereinafter and having a pair of input terminals 31, 31 and a pair of output terminals 33, 33, to another cathode of the device 17. The output circuits of the network 21*a* and the control system 22 include voltage dividers 29*a* and 29*b*, respectively, individual ones of the variable contacts of which are connected to individual control electrodes of a vacuum tube 41 of the duo-triode type comprising a signal-combining device 23. The anodes of the tube 41 are jointly connected through an anode load resistor to a source of potential +B and through a 0–1.5 megacycle filter network 21*c* to the remaining one of the cathodes of the device 17, while the cathode of the tube 41 is connected through ground to the negative terminal of this source. If the translation times of the signals effectively from the amplifier 19 to the cathodes of the picture tube in the device 17 are not equal, compensating delay networks (not shown) may be utilized to make such translation times equal. An input circuit of the synchronous detector 20*a* is connected through a pair of terminals 30, 30 in the control system 22 to the output circuit of a color wave-signal generator 34 to be considered more fully hereinafter.

An output circuit of the detector 14 is coupled to a synchronizing-signal separator 24 having output circuits connected to line and field beam-deflecting windings 27 in the device 17 through a line-frequency generator 25 and a field-frequency generator 26, respectively. The output circuit of the line-frequency generator 25 is also connected to a terminal 32 in the control system 22 for a purpose which will be described more fully hereinafter. The output circuit of the (AGC) supply in the unit 14 is connected to the input circuits of one or more of the tubes of the radio-frequency amplifier 11, the oscillator-modulator 12 and the intermediate-frequency amplifier 13 in a well-known manner.

A sound-signal reproducing unit 28 is also connected to the output circuit of the intermediate-frequency amplifier 13 and may include one or more stages of intermediate-frequency amplification, a sound-signal detector, one or more stages of audio-frequency amplification and a sound-reproducing device.

It will be understood that except for portions of the unit 22 and the signal-combining device 23 the various units thus far described with reference to the receiver of Fig. 1 may have any conventional construction and design, the details of such units being well known in the art, rendering a further description thereof unnecessary.

*General operation of receiver of Fig. 1*

Considering briefly the operation of the receiver of Fig. 1 as a whole and assuming for the moment that the unit 22 is a conventional device for deriving from a modulated subcarrier wave signal a color-signal component, specifically a color difference signal, related to one of the primary color characteristics of the televised image, a desired modulated television wave signal is intercepted by the antenna system 10, 10 and selected and amplified in the radio-frequency amplifier 11. The latter signal is applied to the oscillator-modulator 12 wherein it is converted into an intermediate-frequency signal which is selectively amplified in the unit 13 and applied to the detector 14 for derivation of the modulation components of the wave signal. One of these components, being effectively the video-frequency signal and having a bandwidth of approximately 0–4 megacycles, represents the brightness or detail of the color image and is translated through the network 15, amplified in the unit 16 and applied as a control potential to the control electrode of the cathode-ray tube in the image-reproducing device 17. Another of the components derived in the detector 14, having a bandwidth of substantially 2.5–4 megacycles and representing a subcarrier wave signal modulated by color-signal components, is translated through the filter network 18 and amplified in the unit 19. The synchronous detector 20*a* and a corresponding detector in the control system 22, under the control of a signal developed by the color wave-signal generator 34, derive different ones of the color-signal components which are individually translated through the network 21*a* and a similar network in the unit 22 for application to different cathodes in the device 17. The signal applied to one of these cathodes is a color difference signal representing one primary color, for example, red while the signal applied to a second cathode is another color difference signal representing a different primary color, for example, blue. The unit 23 combines portions of the two derived signals to develop a third color difference signal representing a third primary color, for example, green, the developed signal being applied to the remaining cathode in the device 17.

The manner in which the two derived signals, representing, specifically the red and blue colors of the image, are combined to form the signal representative of green will be more fully understood by considering the compositions of the color and brightness signals as developed at the transmitter. The signals representative of red and blue are $n(R—Y)$ and $m(B—Y)$, respectively, where $n$ and $m$ are constants representative of the relative amplitudes of the transmitted signals R—Y and B—Y, respectively; R and B are the red and blue color signals, respectively, and Y is the brightness signal. The brightness signal is further defined for a predetermined system as follows:

$$Y = .59G + .30R + .11B \qquad (1)$$

where G is the green color signal.

It is apparent that, as the color difference signals R—Y and B—Y are combined in the cathode-ray tube of the device 17 with the brightness signal Y, the color signals R and B are developed.

The three signals Y, R—Y and B—Y include all of the information required to reproduce an image having the three basic colors green, red and blue with the proper brightness. By employing a system which defines the signal representative of green as follows:

$$G—Y = —.51(R—Y) — .19(B—Y) \qquad (2)$$

such signal may be developed at the receiver by combining proper amounts of the signals R—Y and B—Y in the proper senses.

To effect the operation just described, voltage dividers 29*a* and 29*b* apply the desired proportions of the signals R—Y and B—Y to the tube 41. In a conventional manner, the applied signals appear as inverted signals in the anode circuit of the tube and develop a resultant signal G—Y across the anode load resistor, this signal being applied through the unit 21*c* to a cathode of the cathode-ray tube in the device 17.

The color-signal components applied to the different cathodes of the picture tube in the device 17 individually cooperate with the brightness signal applied to the control electrode of this tube to effect intensity modulation of the different electron beams in accordance with the color intelligence being transmitted.

The synchronizing-signal components of the received signal are separated form the other components thereof in the unit 24 and are utilized to synchronize the operation of the line-frequency and field-frequency generators 25 and 26, respectively, and, as will be described more fully hereinafter, of the color wave-signal generator 34 with the operation of corresponding units at the transmitter. The generators 25 and 26 supply signals of saw-tooth wave form which are properly synchronized with reference to the transmitted television signal and applied to the deflection windings 27 of the device 17. The combination of the line and field deflection of the beams in the device 17 and the intensity modulation thereof by the signals applied to the cathodes and control electrode of the cathode-ray tube results in the reproduction on the viewing screen of the device 17 of a color image of the subject being televised.

The automatic-gain-control or (AGC) signal derived in the unit 14 is effective to control the amplification of one or more of the units 11, 12 and 13 to maintain the signal input to the detector 14 and to the sound-signal reproducing unit 28 within a relatively narrow range for a wide range of received signal intensities.

The sound-signal modulated wave signal related to the desired television wave signal is also intercepted by the antenna system 10, 10 and effectively translated through the units 11, 12 and 13 and applied to the unit 28. In the latter unit the applied signal is amplified and the modulation components thereof are detected and further amplified and utilized to reproduce in a conventional manner the sound related to the television image.

*Description of control system of Fig. 1*

Referring now in particular to the control system 22, embodying one form of the present invention, this system comprises a circuit for supplying a composite video-frequency signal comprising during recurring intervals, that is, during the recurring picture signal portions of the video-frequency signal, a color-television subcarrier wave signal amplitude-modulated at different phase points, for example, in phase and in quadrature-phase, by individual ones of signals representative of a plurality of colors. This circuit also supplies during intervening intervals, that is, during the intervening line-blanking intervals, a color-synchronizing signal having a phase corresponding to a reference phase of the subcarrier wave signal, for example, in phase with the subcarrier wave signal. This circuit comprises the terminals 31, 31 and the conductors connected thereto, the terminals 31, 31 being coupled by means of these conductors through a phase-delay circuit 38 to a synchronous detector 20*b*. The phase-delay circuit 38 comprises a transformer 46 the secondary winding of which is a portion of a parallel-tuned circuit including a condenser 47 having a resonant frequency equal to that of the color-television wave signal. The transformer 46 with a tuned secondary winding effects, in a conventional manner, a 90° delay in phase of the color-television wave signal applied thereto.

The control system also comprises the signal generator for generating a sine-wave signal harmonically related, perferably equal, in frequency to the above-mentioned wave signal, for example, having a frequency of approximately 3.9 megacycles, and which has a phase which tends to vary from a predetermined phase relation with respect to the previously mentioned reference phase, for example, it varies from a quadrature-phase relation with respect to the phase of the color-synchronizing signal as measured at the input circuit of the detector 20$b$. This generator comprises a color wave-signal generator 34 having an output circuit coupled through a condenser 45 to the synchronous detector 20$b$ and an input circuit coupled to a frequency-control circuit 35. The generator 34 may be of a conventional sine-wave type.

In addition, the control system comprises a control apparatus including a single detection device 20$b$ and a control circuit 37, the detection device 20$b$ being responsive jointly during the previously mentioned recurring intervals to the subcarrier wave signal and the generated signal for deriving a signal representative of the modluation component of the wave signal at a phase point substantially in quadrature with the reference phase of the color-synchronizing signal at the input circuit to the detector 20$b$. The detection device 20$b$ is also responsive jointly during the intervening intervals to the color-synchronizing signal and the generated signal, the control circuit 37 being coupled to the detection device 20$b$ and effective therewith to derive during these intervening intervals a control effect representative of the relative phase of the generated signal and the color-synchronizing signal.

More specifically, the detector 20$b$ includes a diode 48 having the cathode input circuit thereof coupled to one terminal of the secondary winding of the transformer 46 and the anode thereof coupled to a 0–1.5 megacycle filter network 21$b$. The low-pass filter network 21$b$ is of a modified $\pi$ type comprising parallel-disposed condensers 49, 50, together with a parallel-disposed load resistor 51, and having an inductor 52 coupled between corresponding terminals of the condensers 49 and 50. The other terminal of the secondary winding of the transformer 46 is directly connected to common terminals of the condensers 49, 50 and the resistor 51, and through a voltage divider comprising series-connected resistors 53 and 54 to a source of bias potential +C. The output circuit of the filter network 21$b$ is connected through the terminals 33, 33 to the cathode circuit in the image-reproducing device 17, as previously described. The output circuit of the generator 34 is coupled to the anode of the diode 48 through a condenser 45.

The control circuit 37 includes a keyed or gated amplifier comprising a duo-triode electron-discharge tube 55. One control electrode of the tube 55 is connected through a resistor 56 to the output circuit of the filter network 21$b$ while the other control electrode thereof is positively biased with respect to the system ground by being adjustably connected to a voltage divider including series-connected resistors 57, 58 and 59 coupled across a source of potential +B. A by-pass condenser 60 proportioned to by-pass signals having frequencies in excess of the relatively low frequency of the above-mentioned control effect is connected in parallel with the resistor 57. The cathode of the tube 55 is also connected to the voltage divider at the junction of resistors 58 and 59 so as to be at a higher positive potential than the positively biased control electrode. The anodes 39 and 40 of the tube 55 are separately connected through individual load resistors, resistors 61 and 62, respectively, to the source of +B potential and through a conventional signal-integration circuit 36 to input circuits of the frequency-control circuit 35.

The control system also includes a circuit for supplying a pulse during each of the previously mentioned intervening intervals, for example, during the line-blanking intervals, specifically, the terminals 32, 32 coupled through a condenser 44 to the cathode of the tube 55. As previcusly stated, the terminals 32, 32 are connected to the output circuit of the line-frequency generator 25 and are responsive to the line-retrace pulse developed in the line-deflection winding of the deflection windings 27.

The control system additionally includes a circuit for integrating the control effect developed in the control apparatus 37 and for applying the integrated control effect to the signal generator 34 for maintaining the phase of the signal generated therein substantially at a predetermined phase relation, for example, in quadrature-phase, with the phase of the color-synchronizing signal at the input circuit of the detector 20$b$. The latter circuit includes the signal-integration circuit 36 which may be of any conventional type, of example, comprising a resistor-condenser circuit, and the frequency-control circuit 35 which may be of conventional reactance-tube type for applying the integrated signal to the generator 34.

*Explanation of operation of the control system of Fig. 1*

Considering now the operation of the control system 22 of Fig. 1, to maintain the signal generated in the unit 34 at a predetermined phase relation with respect to a phase of the color-television wave signal applied to the terminals 31, 31, this color-television wave signal, including its modulation components, is delayed in phase by 90° in the circuit 38 and applied to a circuit including one electrode, specifically, the cathode of the diode 48. The signal generated in the unit 34 is applied through the condenser 45 to a circuit including the other electrode of the diode 48, specifically, the anode thereof. The signals on the cathode and anode of the diode 48 being in phase with each other combine during the recurring picture signal portions of the color-television wave signal to derive the modulation component which modulates the color-television wave signal in quadrature-phase. This modulation component is representative of one of the primary colors of a color image, and in the system under discussion is the color difference signal B—Y representative of blue. The 0–1.5 megacycle components of this signal are then translated through the filter network 21$b$ and the terminals 33, 33 for application to a cathode circuit of the device 17.

Before considering the operation of the control system 22 during the intervening intervals, specifically, during the line-blanking intervals, to derive a control effect to control the phasing of the signal developed in the unit 34, it will be helpful to refer to the wave form represented in Fig. 2. The wave form of Fig. 2 represents a portion of the composite video-frequency signal developed in the output circuit of the detector 14 and includes during the times $t_1$–$t_2$, and $t_3$–$t_4$ fragments of the recurring picture signal portions of a complete color-television video-frequency signal. The part of the wave form between the times $t_2$ and $t_3$ represents that portion of the color-television video-frequency signal which occurs during an interval intervening the previously mentioned recurring intervals and, specifically, represents the signal present during a line-blanking interval. The latter signal includes a line-synchronizing pulse A having a "back porch" portion A′ including a color synchronizing signal represented by curve B. As previously mentioned herein, the color synchronizing signal is actually a portion or burst of the subcarrier wave signal and has a phase corresponding to a phase point of the subcarrier wave signal which is modulated by a predetermined color signal. In the present form of the color-television system, the color burst signal is in phase with that phase point of the subcarrier wave signal which is modulated by the color difference signal representative of red or the R—Y signal. Therefore, the phase of the color burst signal may be utilized as a reference phase for the locally generated color wave signal developed by the unit 34 for maintaining the phase of the latter signal substantially at a predetermined phase with relation to the subcarrier wave signal. More specifically, the phase of the locally generated signal may be so controlled that when combined with the modulated subcarrier wave signal in the synchronous detector 20*a* the latter unit will be effective to derive the R—Y modulation component at the proper phase point of the subcarrier wave signal and when similarly combined in the detector 20*b* the latter unit will be effective to derive the B—Y component at the quadrature-phase point of the subcarrier wave signal. In other words, a color synchronizing signal which is properly in phase with the locally generated wave signal in the detector 20*a* should be in quadrature-phase with the locally generated signal in the detector 20*b*, if the modulation components R—Y and B—Y are to be derived.

Referring again to the system 22 of Fig. 1, it is apparent that during the intervals intervening the actual picture signal portions of the color-television signal applied to the cathode circuit of the diode 48, the line-blanking portions of this signal are applied to this cathode. It is also apparent that the locally generated color wave signal is continuously applied to the anode circuit of the diode 48. The composite color signal including the color burst signal is delayed in phase by 90° in the circuit 38. During that portion of the horizontal blanking interval which includes the color burst signal, the phasing of the color burst signal, as delayed in phase by 90°, and of the locally generated color wave signal is compared in the unit **20*b*** and a resultant signal is developed in the output circuit thereof which is indicative of the phasing of the two signals.

The operation just described is more easily understood by referring to the wave forms of Fig. 3 wherein curve A represents the color burst signal on an enlarged time scale, and curve B represents the locally generated color wave signal to the same time scale. As drawn, curves A and B indicate that the signals represented thereby are in quadrature relation and, therefore, indicate the proper phasing of the color wave signal and the color burst signal. If the signal represented by curve A is applied to the cathode circuit of the diode 48, and the signal represented by curve B is applied to the anode circuit thereof, and these signals are in quadrature-phase, a resultant signal is developed in the anode circuit of the tube 48. The resultant signal has a frequency related to the frequencies of the signals represented by curves A and B and an average potential of approximately the steady-state or bias potential on the anode of the tube 48. If the signals represented by curves A and B are not in quadrature-phase, the resultant signal will have an average potential which is higher or lower than the steady-state potential on the anode of the tube 48, the sensing or direction of deviation of the resultant signal from the steady-state potential depending on the direction of the phase error of the signals. After the high-frequency resultant signal is translated through the network **21*b*, a signal of relatively low frequency, having an amplitude representative of the relative phasing of signals represented by curves A and B, is developed in the output circuit of the network 21*b*. If these signals are in proper quadrature-phase relation, a resultant signal, as represented by curve C, is developed, whereas, if the phasing is less than quadrature-phase, a lower amplitude signal, represented by curve C′, is developed, and if greater than quadrature-phase, a higher amplitude signal, represented by curve C″, is developed. In other words, the unit 21*b* operates as both a synchronous detector for deriving the color difference signal B—Y and as a phase detector for developing an error signal whenever the generator 34** is out of synchronism.

The signal developed in the output circuit of the network **21*b*, and represented by one of curves C, C′ and C″, depending on the relative phase of the burst signal and the local signal, is applied through the resistor 56 to one control electrode circuit of the tube 55. The bias applied to the other control electrode circuit of the tube 55 is so adjusted that when the locally generated color wave signal and the color burst signal are in quadrature-phase, thit is, in proper phase relation, substantially equal currents flow in the two anode circuits of the tube 55 and, when combined in opposite senses in a load circuit in the unit 36, effectively cancel each other, thereby, effectively causing no output signal or difference in potential to be developed between the anodes of the tube 55. The circuit including the tube 55 operates in this manner if a signal, as represented by curve C, is applied thereto through the resistor 56. If a signal, as represented by curve C′, indicating a misphasing in one sense of the color wave signal and the color burst signal, is applied through the resistor 56 to the one control electrode circuit of the tube 55, it is apparent that less anode current flows through the anode 39, and increased anode current flows through the anode 40 to compensate for the lower current. The degenerative effect of the resistors 58 and 57 in the cathode circuit of the tube 55 causes the total current through the resistors to be substantially constant at all times thereby requiring that if the anode-cathode current is lowered in one portion of the tube it will be proportionally increased in the other portion thereof. Due to this difference in anode-current flow, a signal having a definite sensing is effectively developed between the anodes 39, 40 and is applied to the integration circuit 36. Similarly, if a signal, is represented by curve C″, is applied to the tube 55 a signal having an opposite sensing is applied to the integration circuit 36**.

The above explanation of the operation of the tube 55 has assumed that the tube is normally conductive. In order that the control effect developed in the output circuit of this tube represent substantially only the misphasing of the color burst signal and the locally generated color wave signal, it is desirable to develop an output signal for application to the unit 36 substantially only during the time when the color burst signal is present. This result is obtained by making the cathode of the tube 55 more positive than the control electrode thereof, thereby causing the tube to be normally nonconductive, and then by driving the cathode negative by means of a horizontal retrace pulse represented in idealized form by curve D, applied from the horizontal deflection winding through the terminals 32, 32. By so keying or gating the tube 55, control signals are applied to the integration circuit only during the periods when the color burst signals are present. The signal-integration circuit 36 integrates the applied signal over the period of a horizontal line, and preferably over a greater period, and applies a control potential to the frequency-control circuit 35 to control in a conventional manner the phase of the signal developed in the generator 34.

The control system 22 of Fig. 1 has many desirable features. This system requires only the addition of a keyed amplifier 37 and the integration circuit 36 to a color-television receiver such as described in the application 159,212 previously referred to herein. Nevertheless, in the system 22 of Fig. 1, the control effects developed in the unit 37 are potential deviations about a potential approximately +B with respect to a common potential or chassis ground. This requires that the integration circuit 36 and possibly the input circuit of the frequency-control circuit 35 operate isolated from the system ground in order that the control potentials remain within the handling capabilities of such circuits. In addition, the control effects developed in the system 22 of Fig. 1 are effects averaged from one color burst signal to the next. Thus, the control of the generator 34 may not be as critical or as accurate as might be desired.

*Description and explanation of operation of control control system of Fig. 4*

The limitations just considered are obviated in a control system 422 of the type represented in Fig. 4, this system being generally similar to that of Fig. 1, corresponding components thereof being identified by the same reference characters. The system 422 differs from that of Fig. 1 in that it includes a balanced peak-detector circuit 70 coupled between the output circuit of the keyed amplifier 37 and the input circuit of the signal-integration circuit 36.

The peak-detector circuit 70 includes two parallel-disposed diodes 71 and 72 having the cathodes thereof connected through similar series-connected resistors 73, 74, and individually coupled to separate output circuits of the keyed amplifier 37 through individual ones of condensers 75, 76, respectively. The anodes of the diodes 71, 72 are also connected by means of similar series-connected resistors 77, 78, the junction of resistors 77, 78 being connected to the junction of resistors 73, 74. The resistors 77 and 78 are normally of greater value than the resistors 73 and 74 in order to maintain a desired balance in the currents flowing therethrough. The anode of the tube 72 is connected to the system ground while the anode of the tube 71 is coupled to the system ground through a by-pass condenser 79 proportioned to translate signals having frequencies higher than those of the relatively low frequency-control effects developed in the control circuit. An integration circuit 36 including in series a resistor 80, a resistor 81 and a condenser 82 is connected between the anodes of the diodes 71, 72. The value of the resistor 80 is much greater than that of the resistor 81, and the junction of these resistors is connected to one terminal of the input circuit of the frequency-control circuit 35. The other terminal of this input circuit is connected to system ground.

The control system of Fig. 4 generally operates in a manner similar to that of the control system 22 of Fig. 1, the operation being improved by the addition of the balanced peak-detector 70. The control potentials developed in the output circuit of the keyed amplifier 37 are applied through the condensers 75, 76 to the cathodes of the tubes 71, 72 to develop potentials on these cathodes. Thus, pulse-type potentials are normally applied to these cathodes. If pulses of equal potential are applied to the cathodes, as would occur if the color burst signal and the locally generated color wave signal have the proper phase relation, each diode circuit develops an output potential approximately equal to the peak potentials of the pulse applied to the circuit. Since the developed potentials are equal and effectively of opposite polarity, the net output potential is zero. If the applied pulses are not of equal potential, representative of misphasing of the color burst signal and the locally generated color wave signal, a potential will be developed across the resistors 77, 78 which will be either positive or negative with respect to system ground depending upon the sense of misphasing. This control potential is then integrated in the signal-integration circuit 36 and applied to the frequency-control circuit 35 to control the phasing of the signal developed in the generator 34. It is apparent that the control signal now applied to the unit 35 is one which varies positively or negatively with respect to system ground. This is a control signal which is preferable to that applied to the unit 35 in the system 22 of Fig. 1 and which varied with respect to a level of approximately +B. In addition, due to the peak-detection action of the diodes 71 and 72, the averaging of the control effect as in the system 22 of Fig. 1 is eliminated.

*Description and explanation of operation of the control system of Fig. 5*

The control systems considered with respect to Figs. 1 and 4 are types utilized in a color-television receiver wherein the color signals continuously occur in the same phase sequence. In the application Serial No. 207,154, previously referred to herein, there has been described a receiver in which the phase sequence at which the modulation components of the subcarrier wave signal are derived is periodically changed. During repeating periods, components representative of green, red and blue may be derived in that order, and during interposed periods, components representative of green, blue and red may be derived in that order. The control system of Fig. 5 is of a form useful in a receiver requiring this periodic changing in the sequence of derivation of the color-signal components.

The system 522 of Fig. 5 is generally similar to the system of Fig. 4, corresponding components thereof being identified by the same reference characters. The system 522 additionally includes a 180° phase-delay circuit 85 and a switching device 86, more fully described in the application Serial No. 207,154 previously referred to herein, arranged to be coupled in series between an amplifier such as the unit 19 of Fig. 1 and a synchronous detector such as the unit 20*a* of Fig. 1. The terminals 42, 42 and 43, 43 correspond to the terminals, 42, 42 and 43, 43 in the units 19 and 20*a*, respectively, of Fig. 1. The switching device 86 has an additional input circuit which is directly connected to the terminals 42, 42 and another circuit for controlling the operating condition of the device which is connected to the output circuit of the balanced detector 70.

The system of Fig. 5 operates in the same manner as the system of Fig. 4 to control the long time or average relative phasing of the signal developed in the generator 34 and the color burst signal. In addition, in one form of a television system in which the sequence of the color-signal components is periodically changed, it is proposed that, at the transmitter, the subcarrier wave signal and the color burst signal developed therefrom be shifted in phase by a predetermined amount with each change in the sequence of the color-signal components. For example, the subcarrier wave signal is shifted by +45° for the change from one sequence to another and by −45° from the other sequence to the one. Therefore, in a system such as is represented in Fig. 5, at the time the color burst signal shifts in phase by ±45°, there is instantaneously developed in the output circuit of the balanced detector 70 a control effect of such magnitude due to the sudden misphasing that it causes the switching device 86 to change from one switch position to another, thereby shifting the phase of the color-television signal by 180°, and as described in the application Serial No. 207,154, changing the sequence in which the color-signal components are derived. In addition, since the control effect is also translated through the signal-integration circuit 36 and applied to the frequency-control circuit 35, the phase of the signal developed in the generator 34 is adjusted to correspond to the new phase of the subcarrier developed at the transmitter. The color signal-detection system in the receiver is thereby controlled to be in synchronism and phase with a corresponding modulation system at the transmitter.

Though the present invention has been described with reference to television systems in which the color signals modulate the subcarrier wave signals at specific phase points, and are derived therefrom at these phase points, it should be understood that the invention is not limited to such systems. In general, the invention is directed to apparatus such as a synchronous detector or similar unit in a color-television receiver to derive both a color-signal component and a control effect representative of the phasing of the locally generated color wave signal and the subcarrier wave signal developed at the transmitter.

While there have been described what are at present considered to be the preferred embodiments of this invention, it will be obvious to those skilled in the art that various changes and modifications may be made therein without departing from the invention, and it is, therefore aimed to cover all such changes and modifications as fall within the true spirit and scope of the invention.

What is claimed is:

1. A control system for a color-television receiver comprising: a circuit for supplying a composite video-frequency signal comprising during recurring intervals a color-television wave signal amplitude-modulated at different phase points by individual ones of signals representative of a plurality of colors and during intervening intervals a color synchronizing signal having a phase related to a reference phase of said wave signal; a signal generator for generating a signal harmonically related in frequency to said wave signal and which has a phase which tends to vary from a predetermined phase relation with respect to said reference phase; a control apparatus including a single detection device and a control circuit coupled in cascade, the input circuit of said detection device being coupled to said supply circuit and said generator and said detection device being responsive jointly during said recurring intervals to said wave signal and said generated signal for deriving a signal representative of the modulation component of said wave signal at a preselected phase point with respect to said reference phase, and being responsive jointly during said intervening intervals to said color synchronizing signal and said generated signal to develop an error signal representative of the relative phases of said generated signal and said color synchronizing signal, said control circuit being responsible to said error signal to derive during said intervening intervals a control effect representative of the said relative phases; and a control device coupled to said signal generator and said control apparatus and responsive to said control effect for maintaining the phase of said generated signal substantially at said predetermined phase relation.

2. A control system for a color-television receiver comprising: a circuit for supplying a composite video-frequency signal comprising during recurring intervals a color-television wave signal amplitude-modulated at different phase points by individual ones of signals representative of a plurality of colors and during intervening intervals a color synchronizing signal having a phase related to a reference phase of said wave signal; a signal generator for generating a signal equal in frequency to said wave signal and which has a phase which tends to vary from a predetermined phase relation with respect to said reference phase; a control apparatus including a single detection device and a control circuit coupled in cascade, the input circuit of said detection device being coupled to said supply circuit and said generator and said detection device being responsive jointly during said recurring intervals to said wave signal and said generated signal for deriving a signal representative of the modulation component of said wave signal at a preselected phase point with respect to said reference phase, and being responsive jointly during said intervening intervals to said color synchronizing signal and said generated signal to develop an error signal representative of the relative phases of said generated signal and said color synchronizing signal, said control circuit being responsive to said error signal to derive during said intervening intervals a control effect representative of said relative phases; and a circuit coupled to said generator and said control apparatus and responsive to said control effect for maintaining the phase of said generated signal substantially at said predetermined phase relation.

3. A control system for a color-television receiver comprising: a circuit for supplying a composite video-frequency signal comprising during recurring intervals a color-television wave signal amplitude-modulated at different phase points by individual ones of signals representative of a plurality of colors and during intervening intervals a color synchronizing signal having a phase corresponding to a reference phase of said wave signal; a signal generator for generating a signal harmonically related in frequency to said wave signal and which has a phase which tends to vary from a predetermined phase relation with respect to said reference phase; a control apparatus including a single detection device and a gating circuit coupled in cascade, the input circuit of said detection device being coupled to said supply circuit and said generator and said detection device being responsive jointly during said recurrent intervals to said wave signal and said generated signal for deriving a signal representative of the modulation component of said wave signal at a phase point substantially in quadrature with said reference phase, and being responsive jointly during said intervening intervals to said color synchronizing signal and said generated signal to develop an error signal representative of the relative phases of said generated signal and said color synchronizing signal, said gating circuit being conductive only during said intervening intervals and responsive to said error signal to derive during said intervening intervals a control effect representative of said relative phases; and a circuit coupled to said generator and said control apparatus and responsive to said control effect for maintaining the phase of said generated signal substantially at said predetermined phase relation.

4. A control system for a color-television receiver comprising: a circuit for supplying a composite video-frequency signal comprising during recurring intervals a color-television wave signal amplitude-modulated at different phase points by individual ones of signals representative of a plurality of colors and during intervening intervals a color synchronizing signal having a phase corresponding to a reference phase of said wave signal; a signal generator for generating a signal harmonically related in frequency to said wave signal and which has a phase which tends to vary from a predetermined phase relation with respect to said reference phase; a control apparatus including a single detector, a low-pass filter network and a control circuit coupled in cascade in the order named, the input circuit of said detector being coupled to said supply circuit and said generator and said detector being responsive jointly during said recurring intervals to said wave signal and said generated signal and effective with said network to derive a signal representative of the modulation component of said wave signal at a phase point substantially in quadrature with said reference phase, and being responsive jointly during said intervening intervals to said color synchronizing signal and said generated signal to develop an error signal representative of the relative phases of said generated signal and said color synchronizing signal, said control circuit being responsive to said error signal to derive during said intervening intervals a control effect representative of said relative phases; and a circuit coupled to said generator and said control apparatus and responsive to said control effect for maintaining the phase of said generated signal substantially at said predetermined phase relation.

5. A control system for a color-television receiver comprising: a circuit for supplying a composite video-frequency signal comprising during recurring intervals a color-television wave signal amplitude-modulated at different phase points by individual ones of signals representative of a plurality of colors and during intervening intervals a color synchronizing signal having a phase corresponding to a reference phase of said wave signal; a signal generator for generating a signal harmonically related in frequency to said wave signal and which has a phase which tends to vary from a predetermined phase relation with respect to said reference phase; a control apparatus including a diode, a low-pass filter network coupled to the output circuit of said diode and a control circuit coupled to said network, the input circuit of said diode being coupled to said supply circuit and said generator and said diode being responsive jointly during said recurring intervals to said wave signal and said generated signal and effective with said network to derive a signal representative of the modulation component of said wave signal at a phase point substantially in quadrature with said reference phase, and being responsive jointly during said intervening intervals to said color synchronizing signal and said generated signal to develop an error signal representative of the relative phases of said generated signal and said color synchronizing signal, said control circuit being responsive to said error signal to derived during said intervening intervals a control effect representative of said relative phases; and a circuit coupled to said generator and said control apparatus and responsive to said control effect for maintaining the phase of said generated signal substantially at said predetermined phase relation.

6. A control system for a color-television receiver comprising: a circuit for supplying a composite video-frequency signal comprising during recurring intervals a color-television wave signal amplitude-modulated at different phase points by individual ones of signals representative of a plurality of colors and during intervening intervals a color synchronizing signal having a phase corresponding to a reference phase of said wave signal; a signal generator for generating a signal harmonically related in frequency to said wave signal and which has a phase which tends to vary from a predetermined phase relation with respect to said reference phase; a pulse-supply circuit for supplying a pulse during each of said intervening intervals; a control apparatus including a single detection device coupled to said supply circuit and said generator and a control circuit coupled to the output circuit of said detection device and to said pulse-supply circuit, said detection device being responsive jointly during said recurring intervals to said wave signal and said generated signal for deriving a signal representative of the modulation component of said wave signal at a phase point substantially in quadrature with said reference phase, and being responsive jointly during said intervening intervals to said color synchronizing signal and said generated signal to develop an error signal representative of the relative phases of said generated signal and said color synchronizing signal, said control circuit being responsive to said supplied pulse and responsive to said error signal to derive during said intervening intervals a control effect representative of said relative phases; and a circuit coupled to said generator and said control apparatus and responsive to said control effect for maintaining the phase of said generated signal substantially at said predetermined phase relation.

7. A control system for a color-television receiver comprising: a circuit for supplying a composite video-frequency signal comprising during the recurring picture-signal portions thereof a color-television wave signal amplitude-modulated at different phase points by individual ones of signals representative of a plurality of colors and during intervening line-blanking intervals a color synchronizing signal having a phase corresponding to a reference phase of said wave signal; a signal generator for generating a signal harmonically related in frequency to said wave signal and which has a phase which tends to vary from a predetermined phase relation with respect to said reference phase; a pulse-supply circuit for supplying a pulse during each of said blanking intervals; a control apparatus including a single detection device coupled to said supply circuit and said generator and a control circuit coupled to the output circuit of said detection device and to said pulse-supply circuit, said detection device being responsive jointly during said recurring picture-signal portions to said wave signal and said generated signal for deriving a signal representative of the modulation component of said wave signal at a phase point substantially in quadrature with said reference phase, and being responsive jointly during said blanking intervals to said color synchronizing signal and said generated signal to develop an error signal representative of the relative phases of said generated signal and said color synchronizing signal, said control circuit being responsive to said supplied pulse and responsive to said error signal to derive during said blanking intervals a control effect representative of said relative phases; and a circuit coupled to said generator and said control apparatus and responsive to said control effect for maintaining the phase of said generated signal substantially at said predetermined phase relation.

8. A control system for a color-television receiver comprising: a circuit for supplying a composite video-frequency signal comprising during recurring intervals a color-television wave signal amplitude-modulated at different phase points by individual ones of signals representative of a plurality of colors and during intervening intervals a color synchronizing signal having a phase corresponding to a reference phase of said wave signal; a signal generator for generating a signal harmonically related in frequency to said wave signal and which has a phase which tends to vary from a predetermined phase relation with respect to said reference phase; a control apparatus including a single detection device coupled to said supply circuit and said generator and a control circuit coupled to the output circuit of said detection device, said detection device being responsive jointly during said recurring intervals to said wave signal and said generated signal for deriving a signal representative of the modulation component of said wave signal at a phase point substantially in quadrature with said reference phase, and being responsive jointly during said intervening intervals to said color synchronizing signal and said generated signal to develop an error signal representative of the relative phases of said generated signal and said color synchronizing signal, said control circuit being responsive to said error signal to derived during said intervening intervals a control effect representative of said relative phases; and a signal-integration circuit coupled to said generator and said control apparatus and responsive to said control effect for integrating said control effect and for applying it to said signal generator for maintaining the phase of said generated signal substantially at said predetermined phase relation.

9. A control system for a color-television receiver comprising: a circuit for supplying a composite video-frequency signal comprising during recurring intervals a color-television wave signal amplitude-modulated at different phase points by individual ones of signals representative of a plurality of colors and during intervening intervals a color synchronizing signal having a phase corresponding to a reference phase of said wave signal; a signal generator for generating a signal harmonically related in frequency to said wave signal and which has a phase which tends to vary from a predetermined phase relation with respect to said reference phase; a control apparatus including a single detection device coupled to said supply circuit and said generator and a control circuit coupled to the output circuit of said detection device, said detection device being responsive jointly during said recurring intervals to said wave signal and said generated signal for deriving a signal representative of the modulation component of said wave signal at a phase point substantially in quadrature with said reference phase, and being responsive jointly during said intervening intervals to said color synchronizing signal and said generated signal to develop an error signal representative of the relative phases of said generated signal and said color synchronizing signal, said control circuit being responsive to said error signal to derive during said intervining intervals a control effect representative of said relative phases; a signal-integration circuit coupled to said control apparatus for integrating said control effect; and a reactance circuit coupled to said generator and said signal-integration circuit and responsive to said integrated control effect for applying said integrated control effect to said signal generator for maintaining the phase of said generated signal substantially at said predetermined phase relation.

10. A control system for a color-television receiver comprising: a circuit for supplying a composite video-frequency signal comprising during recurring intervals a color-television wave signal amplitude-modulated at different phase points by individual ones of signals representative of a plurality of colors and during intervening intervals a color synchronizing signal having a phase corresponding to a reference phase of said wave signal; a signal generator for generating a signal harmonically related in frequency to said wave signal and which has a phase which tends to vary from a predetermined phase relation with respect to said reference phase; a pulse-supply circuit for supplying a pulse having each of said intervening intervals; a control apparatus including a single detection device coupled to said supply circuit and said generator and a control circuit coupled to the output circuit of said detection device and to said pulse-supply circuit, said detection device being responsive jointly during said recurring intervals to said wave signal and said generated signal for deriving a signal representative of the modulation component of said wave signal at a phase point substantially in quadrature with said reference phase, and being responsive jointly during said intervening intervals to said color synchronizing signal and said generated signal to develop an error signal representative of the relative phases of said generated signal and said color synchronizing signal, said control circuit being responsive to said supplied pulse and responsive to said error signal to derived during said intervening intervals said supplied pulse and a control effect representative of said relative phases; a balanced detector coupled to said control apparatus and responsive to said control effect and said derived pulse for detecting said control effect to the exclusion of said derived pulse; and a circuit coupled to said generator and said balanced detector and responsive to said detected control effect for applying said detected control effect to said signal generator for maintaining the phase of said generated signal substantially at said predetermined phase relation.

11. A control system for a color-television receiver comprising: a circuit for supplying a composite video-frequency signal comprising during recurring intervals a color-television wave signal amplitude-modulated in phase and in quadrature-phase by individual ones of signals representative of a plurality of colors and during intervening intervals a color synchronizing signal substantially in phase with said wave signal; a signal generator for generating a signal equal in frequency to said wave signal and which has a phase which tends to vary from a quadrature-phase relation with respect to the phase of said color synchronizing signal; a control apparatus including a signal detection device coupled to said supply circuit and said generator and a control circuit coupled to the output circuit of said detection device, said detection device being responsive jointly during said recurring intervals to said wave signal and said generated signal for deriving a signal representative substantially of the quadrature-phase modulation component of said wave signal, and being responsive jointly during said intervening intervals to said color synchronizing signal and said generated signal to develop an error signal representative of the relative phases of said generated signal and said color synchronizing signal, said control circuit being responsive to said error signal to derive during said intervening intervals a control effect representative of said relative phases; and a circuit coupled to said generator and said control apparatus and responsive to said control effect for applying said control effect to said signal generator for maintaining the phase of said generated signal substantially in quadrature-phase with the phase of said color synchronizing signal.

12. A control system for a color-television receiver comprising: a circuit for supplying a composite video-frequency signal comprising during recurring intervals a color-television wave signal having one phase during repeating periods including some of said intervals and another phase during interposed periods including others of said intervals and comprising during intervening intervals a color synchronizing signal having a phase related to a reference phase of said wave signal, said wave signal being amplitude-modulated at different phase points by individual ones of signals representative of a plurality of colors during said repeating periods in one phase sequence and during said interposed periods in another phase sequence; a signal generator for generating a signal harmonically related in frequency to said wave signal and which has a phase which tends to vary from a predetermined phase relation with respect to said reference phase; a control apparatus including a single detection device coupled to said supply circuit and said generator and a control circuit coupled to the output circuit of said detection device, said detection device being responsive jointly during said recurring intervals to said wave signal and said generated signal for deriving a signal representative of the modulation component of said wave signal at a preselected phase point with respect to said reference phase, and being responsive jointly during said intervening intervals to said color synchronizing signal and said generated signal to develop an error signal representative of the relative phases of said generated signal and said color synchronizing signal, said control circuit being responsive to said error signal to derive during said intervening intervals one control effect representative of said relative phases and on the shift of a phase of said wave signal from said one phase to said other phase to derive another control effect representative of said shift of phase; a switching device coupled to said circuit for supplying said composite video-frequency signal and having at least two switch conditions for translating said wave signal through one path in one of said conditions and another path in another of said conditions; and a control device coupled to said switching device, said control apparatus, and said generator and responsive to said one control effect for maintaining the phase of said generated signal substantially at said predetermined phase relation and responsive to said other control effect for determining the switch condition of said switching device.

13. A control system for a color-television receiver comprising: a circuit for supplying a composite video-frequency signal comprising during recurring intervals a color-television wave signal having one phase during repeating image fields including some of said intervals and another phase during interposed image fields including others of said intervals and comprising during intervening intervals a color synchronizing signal having a phase corresponding to a reference phase of said wave signal, said wave signal being amplitude-modulated at different phase points by individual ones of signals representative of a plurality of colors during said repeating fields in one phase sequence and during said interposed fields in another phase sequence; a signal generator for generating a sine-wave signal harmonically related in frequency to said wave signal and which has a phase which tends to vary from a predetermined phase relation with respect to said reference phase; a control apparatus including a single synchronous demodulator coupled to said supply circuit and said generator and a control circuit coupled to the output circuit of said demodulator, said demodulator being responsive jointly during said recurring intervals to said wave signal and said generated signal for deriving a signal representative of the modulation component of said wave signal at a phase point substantially in quadrature with said reference phase, and being responsive jointly during said intervening intervals to said color synchronizing signal and said generated signal to develop an error signal representative of the relative phases of said generated signal and said color synchronizing signal, said control circuit being responsive to said error signal to derive during said intervening intervals one control effect representative of said relative phases and on the shift of a phase of said wave signal from said one phase to said other phase to derive another control effect representative to said shift of phase; a switching device coupled to said circuit for supplying said composite video-frequency signal and having at least two switch conditions for translating said wave signal through one path in one of said conditions and another path in another of said conditions; and a control device coupled to said switching device, said control apparatus, and said generator and responsive to said one control effect for maintaining the phase of said generated signal substantially at said predetermined phase relation and to said other control effect for determining the switch condition of said switching device.

14. A control system for a color-television receiver comprising: a circuit for supplying a composite video-frequency signal comprising during the trace portions of image lines a color-television wave signal having one phase during repeating image fields including some of said trace portions and another phase during interposed image fields including others of said trace portions and comprising during the retrace portions of said image lines a color synchronizing signal having a phase corresponding to a reference phase of said wave signal, said wave signal being amplitude-modulated at different phase points by individual ones of signals representative of a plurality of colors during said repeating fields in one phase sequence and during said interposed fields in another phase sequence; a signal generator for generating a sine-wave signal harmonically related in frequency to said wave signal and which has a phase which tends to vary from a predetermined phase relation with respect to said reference phase; a control apparatus including a single synchronous demodulator coupled to said supply circuit and said generator and a control circuit coupled to the output circuit of said demodulator, said demodulator being responsive jointly during said trace portions to said wave signal and said generated signal for deriving a signal representative of the modulation component of said wave signal at a phase point substantially in quadrature with said reference phase, and being responsive jointly during said retrace portions to said color synchronizing signal and said generated signal to develop an error signal representative of the relative phases of said generated signal and said color synchronizing signal, said control circuit being responsive to said error signal to derive during said retrace portions one control effect representative of said relative phases and on the shift of a phase of said wave signal from said one phase to said other phase to derive another control effect representative of said shift of phase; a switching device coupled to said circuit for supplying said composite video-frequency signal and having at least two switch conditions for translating said wave signal through one path in one of said conditions and another path in another of said conditions; and a control device coupled to said switching device, said control apparatus, and said generator and responsive to said one control effect for maintaining the phase of said generated signal substantially at said predetermined phase relation and to said other control effect for determining the switch condition of said switching device.

15. A control system for a color-television receiver comprising: a circuit for supplying a composite video-frequency signal comprising during recurring intervals a color-television wave signal amplitude-modulated at different phase points by individual ones of signals representative of a plurality of colors during repeating periods including some of said intervals in one phase sequence and during interposed periods including others of said intervals in another phase sequence and comprising during intervening intervals a color synchronizing signal having one phase with respect to a reference phase of said wave signal during said repeating periods and another phase with respect to said reference phase during said interposed periods; a signal generator for generating a signal harmonically related in frequency to said wave signal and which has a phase which tends to vary from a predetermined phase relation with respect to said reference phase; a control apparatus including a single detection device coupled to said supply circuit and said generator and a control circuit coupled to the output circuit of said detection device, said detection device being responsive jointly during said recurring intervals to said wave signal and said generated signal for deriving a signal representative of the modulation component of said wave signal at a phase point substantially in quadrature with said reference phase, and being responsive jointly during said intervening intervals to said color synchronizing signal and said generated signal to develop an error signal representative of the relative phases of said generated signal and said color synchronizing signal, said control circuit being responsive to said error signal to derive during said intervening intervals one control effect representative of said relative phases and on the shift in phase of said color synchronizing signal from said one phase to said other phase to derive another control effect representative of said shift of phase; a switching device coupled to said circuit for supplying said composite video-frequency signal and having at least two switch conditions for translating said wave signal through one path in one of said conditions and another path in another of said conditions; and a control device coupled to said switching device, said control apparatus, and said generator and responsive to said one control effect for maintaining the phase of said generated signal substantially at said predetermined phase relation and to said other control effect for determining the switch condition of said switching device.

16. A control system for a color-television receiver comprising: a circuit for supplying a composite video-frequency signal having during recurring intervals a color-television wave signal amplitude-modulated at one phase by one and at another phase by another of a pair of signals representative of different colors and having during intervening intervals a color synchronizing signal the phase of which is in quadrature with said one phase; a signal generator for generating a signal harmonically related in frequency to said wave signal and tending to vary from a desired phase relation with respect thereto; signal-detection apparatus coupled to said supply circuit and said generator and having at least one output circuit, for deriving the modulation signals from said wave signal during said recurring intervals to develop a signal representative of the modulation signal at said one phase in said one output circuit, said apparatus being responsive to said color synchronizing signal and said generated signal during said intervening intervals to develop in said one output circuit an error signal representative of the phase of said generated signal with respect to said color synchronizing signal; circuit means coupled to said one output circuit and responsive to said error signal for deriving during said intervening intervals a control effect representative of said error signal and coupled to said signal generator for controlling the phase of said generated signal to maintain said desired phase relation between said generated signal and said wave signal.

17. A control system for a color-television receiver comprising: a circuit for supplying a composite video-frequency signal having during recurring intervals a color-television wave signal amplitude-modulated at one phase by one and at a phase in quadrature with said one phase by another of a pair of signals representative of different colors and having during intervening intervals a color synchronizing signal the phase of which is in quadrature with said one phase; a signal generator for generating a signal harmonically related in frequency to said wave signal and tending to vary from a desired phase relation with respect thereto; signal-detection apparatus coupled to said supply circuit and said generator and having a pair of output circuits, for deriving the modulation signals from quadrature phases of said wave signal during said recurring intervals to develop a signal representative of the modulation signal at said one phase in one of said output circuits, said apparatus being responsive to said color synchronizing signal and said generated signal during said intervening intervals to develop in said one output circuit an error signal representative of the phase of said generated signal with respect to said color synchronizing signal; circuit means coupled to said one output circuit and responsive to said error signal for deriving during said intervening intervals a control effect representative of said error signal and coupled to said signal generator for controlling the phase of said generated signal to maintain said desired phase relation between said generated signal and said wave signal.

18. A control system for a color-television receiver comprising: a circuit for supplying a composite video-frequency signal having during recurring intervals a color-television wave signal amplitude-modulated at one phase by one and at a phase in quadrature with said one phase by another of R—Y and B—Y signals representative, respectively, of red and blue images and having during intervening intervals a color synchronizing signal the phase of which is in quadrature with said one phase; a signal generator for generating a signal harmonically related in frequency to said wave signal and tending to vary from a desired phase relation with respect thereto; signal-detection apparatus coupled to said supply circuit and said generator and having a pair of output circuits, for deriving said R—Y and B—Y signals from quadrature phases of said wave signal during said recurring intervals to develop a signal representative of the one of the R—Y and B—Y signals at said one phase in one of said output circuits, said apparatus being responsive to said color synchroninzing signal and said generated signal during said intervening intervals to develop in said one output circuit an error signal representative of the phase of said generated signal with respect to said color synchronizing signal; a control circuit coupled to said one output circuit and responsive to said error signal for deriving during said intervening intervals a control effect representative of said error signal; and a control device coupled to said control circuit and said signal generator and responsive to said control effect for controlling the phase of said generated signal to maintain said desired phase relation between said generated signal and said wave signal.

References Cited in the file of this patent

UNITED STATES PATENTS

| | | |
|---|---|---|
| 2,558,489 | Kalfaian | May 26, 1951 |
| 2,587,074 | Sziklai | Feb. 26, 1952 |
| 2,594,380 | Barton | Apr. 29, 1952 |
| 2,653,187 | Luck | Sept. 22, 1952 |
| 2,697,744 | Richman | Dec. 21, 1954 |